United States Patent Office 3,759,787
Patented Sept. 18, 1973

3,759,787
NUCLEAR FUEL ELEMENTS
Glen E. McDonald, Strongsville, Ohio, assignor to the United States of America as represented by the Administrator of the National Aeronautics and Space Administration
Filed Sept. 30, 1960, Ser. No. 60,276
Int. Cl. G21c 3/02, 3/06, 3/36
U.S. Cl. 176—169                                   3 Claims The invention described herein may be manufactured and used by or for the Government of the United States of America for governmental purposes without the payment of any royalties thereon or therefor.

This invention concerns tungsten-coated tungsten-uranium dioxide nuclear reactor fuel plates.

The loss at elevated temperatures of uranium dioxide from nuclear reactor fuel plates of tungsten-$UO_2$ composition has been a longstanding problem in the art. This problem has been substantially alleviated through this invention which involves cladding the fuel plates with tungsten.

Tungsten coatings can be applied to tungsten-uranium dioxide fuel plates by many methods such as flame plating, electrolytic decomposition, or decomposition of a chemical compound which contains tungsten. The main purpose of this tungsten coating is to decrease the loss of $UO_2$ from the plates at elevated temperatures. However, none of the previous methods of coating the fuel plates with tungsten reduces the loss of uranium dioxide as much as the preferred embodiment of the invention.

It has been discovered that the loss of $UO_2$ at elevated temperatures from a tungsten clad fuel plate is through the grain boundaries of the tungsten coating and that the loss of $UO_2$ is decreased in proportion to the decreases in these grain boundaries. When first coating the fuel plates with tungsten, no thought had been given to the effect of the size of the grains that made up the tungsten coating and thus all the coatings of tungsten were composed of many small grains. It was thought that the thickness of the coating would control the loss of the $UO_2$. However, it has been found that the thickness of the tungsten coating has no relation to the loss of this $UO_2$ as there appears to be no movement of $UO_2$ through an individual grain. The sole loss apparently results from loss through the grain boundaries.

One way to produce the desired coating of large grained tungsten is to coat the tungsten-$UO_2$ powder compact with powdered tungsten. This product is then sintered and subsequently deformed or mechanically worked and recrystallized to secure large grains of tungsten cladding. A second feasible method for producing the large grained tungsten cladding of this invention is to clad the tungsten-$UO_2$ fuel plates with pure tungsten and then by means of a high temperature are melt only the outermost layer of the clad so that all or nearly all of the grain boundaries are eliminted. As previously indicated, if all of the grain boundaries are eliminated from the cladding, there will essentially be no leakage of the $UO_2$ from the fuel element.

It is thus an object of this invention to solve the problem of the leakage of $UO_2$ from tungsten-$UO_2$ fuel plates at elevated temperatures.

An additional object of the invention is to provide a tungsten-clad tungsten-$UO_2$ nuclear fuel plate.

Another object of the invention is to provide a tungsten-clad tungsten-$UO_2$ nuclear fuel plate wherein a tungsten coating has as few grain boundaries as possible.

A further object of the invention has been to devise a method for the tungsten cladding of tungsten-$UO_2$ fuel plates wherein the tungsten cladding has as few grain boundaries as possible.

Other objects and many attendant advantages of the present invention will be apparent from the following detailed description when taken together with the accompanying drawings in which.

Figure 1:
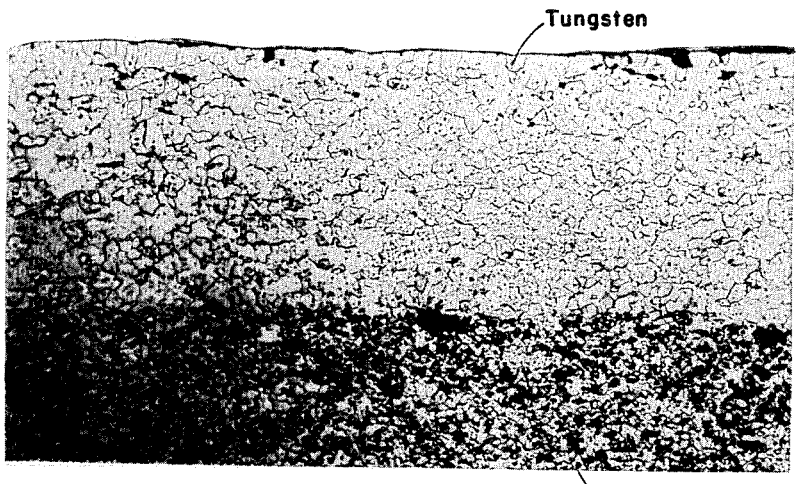
FIG. 1 is a micrograph showing the structure under 250 magnification of a tungsten clad tungsten-$UO_2$ fuel plate wherein the grains of the cladding have not been substantially enlarged.

The following description will outline a particular method of producing the nuclear fuel plates and the cladding thereof with the large grained tungsten. Pure tungsten powder which has a particle size of 1 micron is placed in the bottom of a pressing die in an even layer of such a thickness that it will give a cladding thickness of approximately 0.003 inch after pressing, sintering, and rolling. Next, a powder mixture of tungsten and uranium dioxide is placed on the tungsten powder. This particular mixture contains $UO_2$ in the desired proportion. A sufficient amount of this mixture is added to give the desired thickness of the final fuel plate after pressing, sintering, and rolling to the desired thickness. In this particular example 12.5 weight percent of $UO_2$ is used in the tungsten-$UO_2$ mixture. If a higher percentage of $UO_2$ were used, the amount of $UO_2$ lost by vaporization when the final fuel plate is heated to high temperature in vacuum such as 4500° F. would be greater and if a lesser percentage of $UO_2$ would be used, the loss would be less. This particular relationship applies to an element that is both clad with tungsten plating and unclad. A typical fuel plate contains 5 grams of tungsten and 60 grams of tungsten-$UO_2$. The amount of tungsten required will depend upon the surface area of the fuel plate since it has been found that a thickness of 0.003 inch of tungsten cladding reduces the loss of $UO_2$. Of course, the amount of tungsten-$UO_2$ used can be of any value depending upon the size of the specimen desired. Fuel plates have been made as thin as 0.010 inch and as thick as 0.250 inch. An averare fuel plate weighs from 50 to 70 grams and is 1 x 8 in. and is approximately 0.050 inch thick.

The $UO_2$ used has an average particle size of 3 microns while the tungsten has an average particle size of 1 micron. Naturally, variations in these characteristics will influence the absolute loss of $UO_2$ at elevated temperatures but the plate clad by the herein disclosed novel process will still retain many times more $UO_2$ than an unclad plate.

The mixture of $UO_2$ and tungsten is then covered by a uniformly thick layer of tungsten powder equal in thickness to the bottom layer of tungsten powder. The layers of powder are then pressed at approximately 20,000 pounds per square inch. Actually, any pressure used is sufficient if it will give the necessary strength to the compact to facilitate handling without breakage and help to hasten sintering. Actually these pressures could range as low as 5000 pounds per square inch and up to 10,000 pounds per square inch. During this pressing process a small quantity of stearic acid (2% by weight) is added to the tungsten and $UO_2$ to act as a lubricant and hence secure a greater strength of the compact with a given pressure. Obviously, other lubricants could be used or the process could even be performed without such lubricants.

It is noted that the method described herein actually clads only the two large flat surfaces of the fuel plate. The process could be so varied that the fuel plate could be clad on the narrow edges by placing tungsten around the edges of the die. It is to be pointed out that the tungsten powder could also be applied by first pressing an unclad fuel plate and then adding the cladding powder as a slip and repressing in a steel die or enclosing in a plastic and pressing hydrostatically. The fuel plates may even be clad by a powder rolling operation which would lend itself to continuous automatic operation and to production of long strips. Furthermore, it is possible that the fuel plates could be clad after sintering or even after rolling by placing the tungsten sheet on the fuel plate and bonding the tungsten sheet to the fuel plate by an application of various combinations of high temperature and high pressure. However, the advantage of cladding the tungsten-$UO_2$ by a powder operation is that grain growth through the bond area (interface) is much easier to obtain by powder metallurgy cladding than by the other methods mentioned. Hence the clad is much less likely to separate from the body of the fuel element.

After pressing, the fuel element is placed in a hydrogen furnace and slowly raised to 2800° F. and held at this temperature for 12 hours. Since a lubricant of stearic acid is used, it is necessary to heat the sample slowly to remove this acid. Furthermore, the slow heating process avoids any cracking of the pressed powder compact. Temperatures of approximately 2800° F. have been found to be fairly critical in the process and it has been found that 2000° F. would not sinter the body in any length of time of heating. A temperature much about 2800° F., as for example 3500° F., would result in vaporization of the $UO_2$ from the compact.

After the fuel plate has been heated for a necessary length of time, it is then rolled in a rolling mill to the desired thickness. For successful rolling, the plate is heated to 4000° F. and transferred rapidly to the rolling mill and reduced in thickness to not more than 0.002 inch. The plate is then reheated and rerolled successively to secure the required reduction in thickness. Each reduction is not more than 0.002 inch. The tungsten cladding is, of course, reduced proportionately with the tungsten-$UO_2$ center of the fuel element. The temperature of rolling could possibly be reduced below 4000° F. but rolling at a lower temperature such as 3500° F. results in excessive breakage of the specimens unless the reduction in thickness with each rolling pass is made extremely small. Temperatures higher than 4000° F. cause furnace failure, but conceivably could be used if a furnace could provide them. Actually, there is nothing exceedingly critical in the rolling operation which would affect the performance of the clad in retaining the $UO_2$. The reason for rolling is to secure a density of the fuel plate which would approach 100% since lower density results in lowered strength of the fuel plate. Since the rolling serves only to densify the material, other processes known to the metallurgical art, such as swaging, forging, or extrusion could be used under suitable conditions to densify the clad compact.

After the rolling step, the tungsten cladding may have various microstructures. First of all, it is always dense. The rolling process has secured approximately theoretical density. The grain size of a clad could vary, though, for several reasons. For example, if the fuel plate were left in the rolling mill furnace at 4000° F. for varying lengths of time, the tungsten grains in the clad would grow to different sizes. Additionally, grain growth will tend to accompany densification and a more dense clad will tend to grow large grains more rapidly.

A typical microstructure appearance of a rolled plate at the finish of the rolling process is shown in FIG. 1. The cladding is approximately 0.007 inch thick and the average grain length of the cladding is about 0.0005 inch. While the grain structure in the clad is relatively small, a clad produced by these conditions grows large grains easily and quickly at the temperature of use or at the temperature at which rapid vaporization of the $UO_2$ occurs from an unclad fuel plate.

Figure 2:
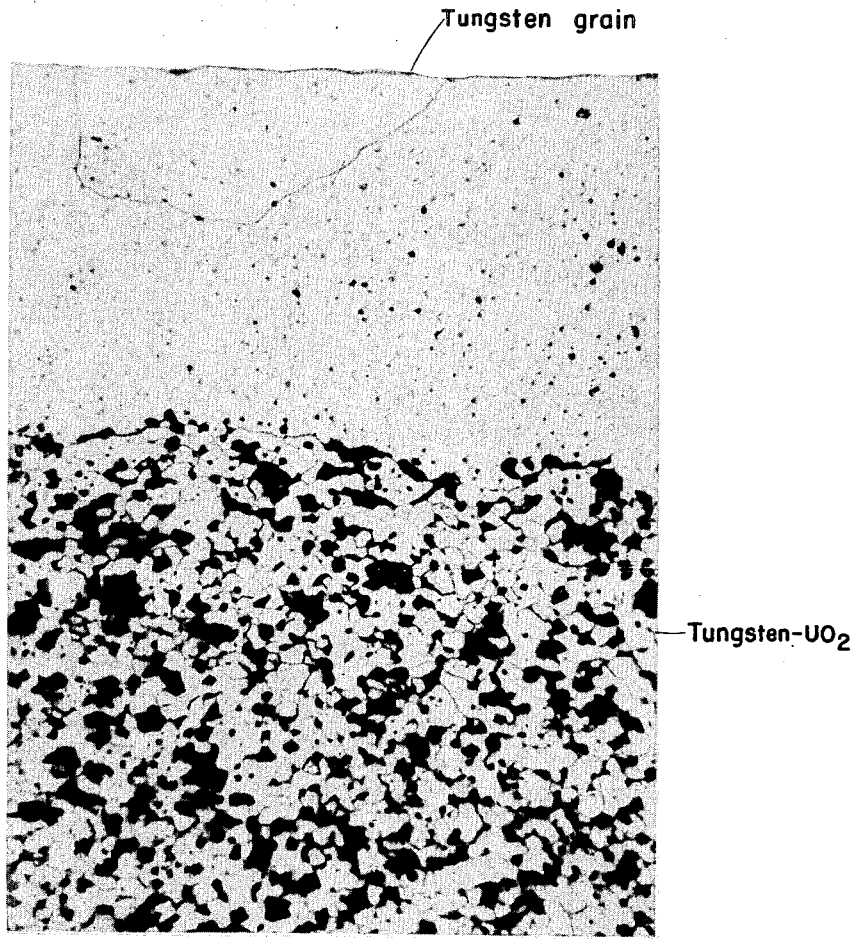
FIG. 2 is a micrograph showing the structure under 750 magnification of a tungsten-$UO_2$ fuel element having a large grained tungsten cladding.

FIG. 2 shows the large grains which result from heating a sample clad by the previously disclosed method. The tungsten clad grains are 0.002 inch thick but are 0.010 inch or longer in length. This particular sample shown in the figure was heated for 5 hours at 4000° F. and lost only 1.35% of its $UO_2$.

Figure 3:
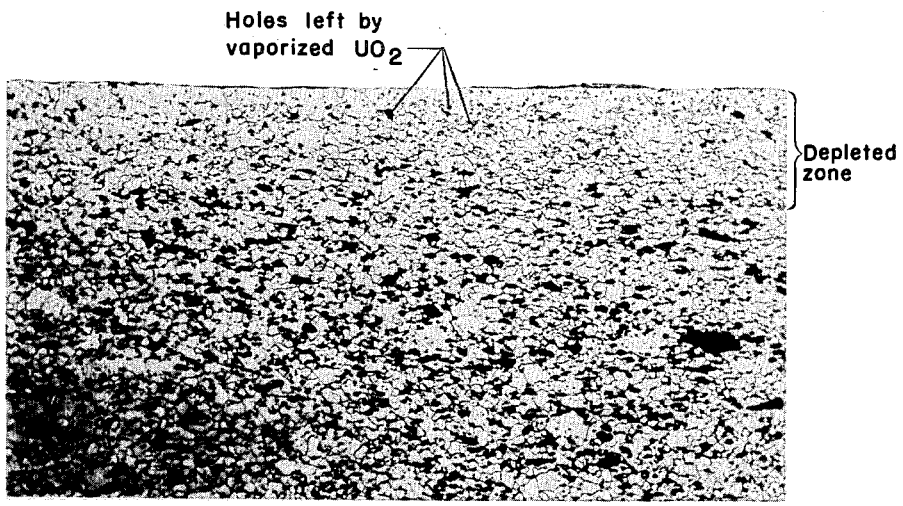
FIG. 3 is a micrograph showing the structure under 250 magnification of an unclad tungsten-$UO_2$ fuel plate.

FIG. 3 shows an unclad specimen which was heated for the same length of time and at the same temperature as the clad specimen shown in FIG. 2. This sample lost 13.9% of its $UO_2$. No loss of $UO_2$ is visible in the clad specimen. However, in this unclad specimen the holes can be seen from where the $UO_2$ has vaporized.

The average grain size along the cladding in the particularly disclosed specimen of the application was, as previously mentioned, approximately 0.010 inch. Other specimens have been observed in which the length of the grain is approximately 0.100 inch. Obviously, the ultimate desire would be to have a cladding in which the length of the grain was the length of the fuel plate so that only a single grain covered the plate. However, it is to be noted that with the relatively few grains now used to cover the plate, and thus the relatively few grain boundaries, there is only a negligible loss of the $UO_2$ from the fuel element.

Obviously, many modifications and variations of the present invention are possible in the light of the above teachings. It is, therefore, to be understood that within the scope of the appended claims the invention may be practiced other than as specifically described.

What is claimed is:
1. A method of providing a tungsten cladding for tungsten-uranium dioxide nuclear fuel plates comprising covering a tungsten-$UO_2$ powder compact with powdered tungsten, pressing at a pressure within the range from 5000 pounds per square inch and 10,000 pounds per square inch said tungsten covered compact, heating said pressed element to a temperature of approximately 2800° F. and finally subjecting said element to continuous successive steps of heating to a temperature of at least 3500° F. and rolling until the grains of the tungsten in the clad have an average length of 0.010 inch.

2. A tungsten-uranium dioxide nuclear fuel plate having a tungsten caldding wherein the grains of tungsten comprising the cladding have an average length of at least 0.010 inch.

3. A tungsten-uranium dioxide nuclear fuel plate having approximately 0.003 inch thick tungsten cladding thereon, said cladding comprising grains of tungsten having an average length of at least 0.010 inch.

References Cited

UNITED STATES PATENTS

| 2,820,751 | 1/1958 | Saller | 204—154.2 |
| 2,863,816 | 12/1958 | Stacy | 204—154.2 |
| 2,886,504 | 5/1959 | Coffinberry. | |

FOREIGN PATENTS

| 799,771 | 8/1958 | Great Britain | 204—193.2 |

OTHER REFERENCES

Hausner et al., Nuclear Fuel Elements, 159, published by Reinhold Publishing Corp., New York, p. 197 relied upon.

CARL D. QUARFORTH, Primary Examiner

R. S. GAITHER, Assistant Examiner

U.S. Cl. X.R.

176—67, 75, 89, 90, 91; 264—0.5